Oct. 9, 1928.
A. J. HOLMAN
1,686,857
ANGULAR VELOCITY STABILIZER FOR ROTATABLE GEAR DRIVEN SHAFTS
Filed Aug. 18, 1927
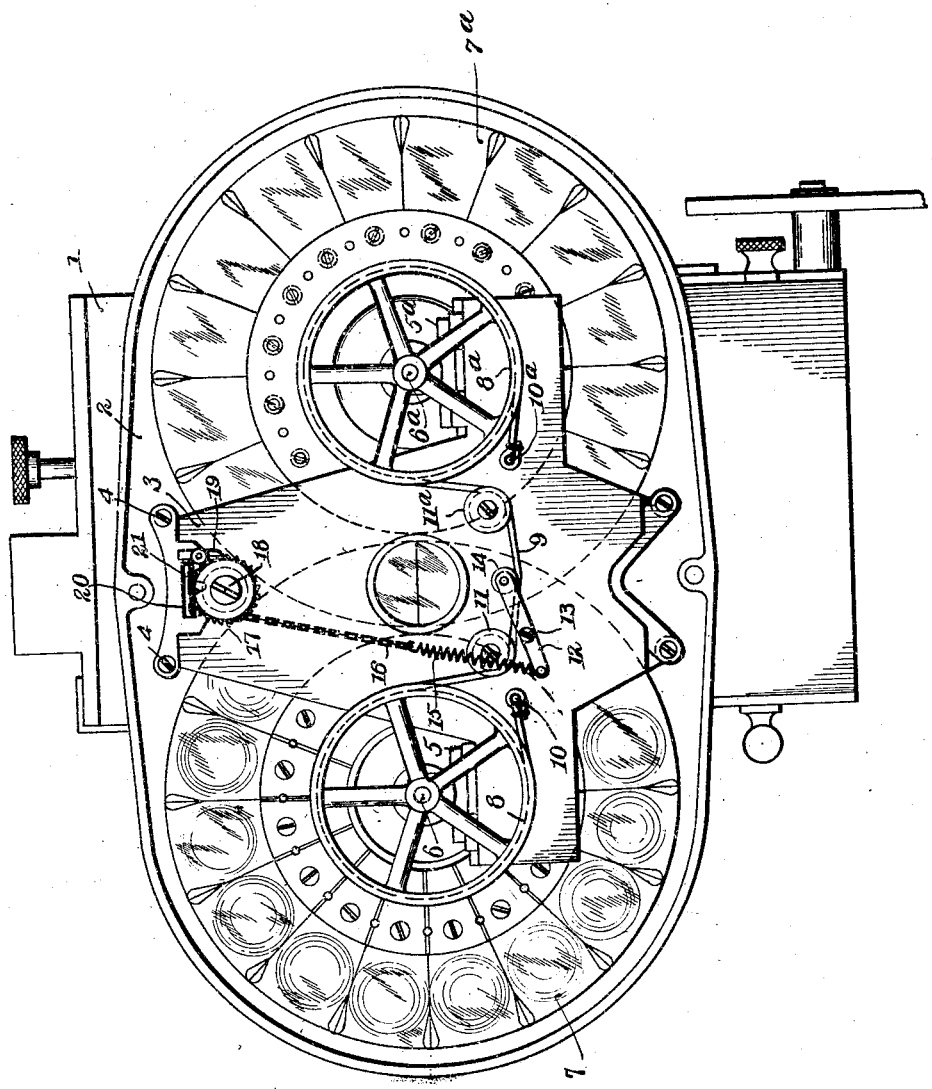

Patented Oct. 9, 1928.

1,686,857

UNITED STATES PATENT OFFICE.

ARTHUR J. HOLMAN, OF BOSTON, MASSACHUSETTS.

ANGULAR-VELOCITY STABILIZER FOR ROTATABLE GEAR-DRIVEN SHAFTS.

Application filed August 18, 1927. Serial No. 213,793.

It has been the object of my invention to provide a means for securing uniform angular velocity of a pair of rotatable shafts such as are employed to support and revolve the overlapping lens discs in a moving picture projector of the type shown in my Letters Patent of the United States No. 1,584,098 dated May 11, 1926. In such a device it is important to maintain the exact registration of the lens centers of overlapping rotatable disc elements at the moment when corresponding pairs of disc element centers cross the optical axis of the complete lens system. It is also necessary to maintain the intended angular relation between coacting lens centers in the revolving discs at all times. As the rotatable discs are gear driven through worm gears mounted thereon and actuated by worms mounted on a common drive shaft, it is apparent that the development of back-lash in the gear trains will have the effect of producing variation in the angular velocity of the shafts on which the rotatable discs are mounted, thus disturbing the intended angular relation between coacting lens centers in the rotatable discs and also disturbing the intended condition of registration of coacting lens centers on the optical axis.

To correct the tendency of back-lash in such a device and to secure uniform wear on the gears so that the effect of wear may be compensated automatically, I have made it the special object of my invention to provide a device of the character indicated which shall influence each rotating shaft in a precisely similar manner and with equal friction torque and which shall provide means for the delicate adjustment of the friction torque required in such a device.

My device may be best understood by reference to the accompanying drawing which shows a front view of a moving picture projector of the type shown in my said patent, having the front cover-plate of the rotatable disc housing and the front objective removed, and showing my angular velocity stabilizer in connection with the shafts whereon the revolving discs are mounted.

Referring now more specifically to the drawing, 1 is the front of the main casing of the projector mechanism on which is mounted the rotatable disc housing 2 within which is mounted a web 3 secured in position by the screw posts 4. Bearing brackets 5 and 5ª, supporting the front ends of shafts 6 and 6ª, are mounted on the web 3. The shafts 6 and 6ª have fast mounted thereon rotatable lens discs 7 and 7ª constructed and arranged in overlapping position, and said shafts are each provided with a worm gear meshing with a driving worm on a common drive shaft as described in my said patent.

Upon the outer extremities of the shafts 6 and 6ª are fast mounted grooved pulleys or brake-wheels 8 and 8ª. A flexible belt 9, preferably a woven fabric cord, is attached at each end to posts 10 and 10ª fixed in the web 3 and fits in the grooves of the brake-wheels 8 and 8ª embracing the greater part of the circumference of each of said wheels, being held in contact therewith by idler rollers 11 and 11ª mounted on said web 3.

A lever arm 12 mounted on web 3 by the pivot screw 13 carries at one end a roller 14 which bears upon the belt 9 at a point substantially midway between the idler rollers 11 and 11ª. To the other end of the lever 12 is attached the spring 15 to which is connected a chain 16 which passes around a grooved ratchet wheel 17 mounted on web 3 by screw-post 18. The end of the chain 16 is attached to the ratchet wheel 17. A pawl 19 engages the teeth on ratchet wheel 17 and prevents its counter clockwise rotation. The pawl 19 is held in engagement with the ratchet wheel 17 by the thrust of a coil spring contained within the cylindrical boss 20 on the web 3. The boss 20 bears a V-shaped indicator 21 projecting partly across the face of the ratchet wheel 17 on which may be placed suitable graduation marks (not shown) to indicate the position of setting of the ratchet wheel 17.

It will be readily understood from the foregoing that the friction of the belt 9 upon the brake-wheels 8 and 8ª, as brake-wheel 8 is rotated clockwise and brake-wheel 8ª is rotated counter clockwise, will prevent back-lash in the gear train which actuates the shafts 6 and 6ª provided the friction between the belt 9 and wheels 8 and 8ª is sufficient to overcome such momentum of the rotatable driven elements as would cause them to rotate momentarily faster than the speed imparted by the driving elements. The desired uniformity of frictional influence upon each rotating system is obtained by regulating the tension of the belt 9 at the point midway between nearest points of contact of the belt with the brake-wheels, the belt being maintained in contact with each brake-wheel over an arc of its circumference which is alike in each instance. It is particularly desirable to avoid excess friction and load upon the gears in such a device in order that as little wear of moving parts may occur as possible, and my device well meets this requirement as it is susceptible to very delicate adjustment inasmuch as a very slight increase in belt tension at the middle portion is multiplied toward the ends of the belt owing to the direction of rotation of the brake-wheels. This delicate adjustment may be obtained by turning the ratchet wheel 17 so as to vary the tension of the spring 15 by which the lever 12 is influenced so as to regulate the belt tension at the middle portion.

The desired adjustment of belt tension is largely determined by trial and graduation marks upon the ratchet wheel 17 to be read in connection with the indicator 21 will assist in resetting the device in case the adjustment is disturbed for any reason.

Having thus fully described my invention, what I claim is,—

1. In a device of the character specified the combination of a pair of gear driven rotatable shafts arranged to rotate in opposite directions, brake-wheels fast mounted on said shafts, a belt arranged to contact with equal arcs on said brake-wheels, and means for varying the tension of said belt.

2. In a device of the character specified the combination of a pair of gear driven rotatable shafts arranged to rotate in opposite directions, brake-wheels fast mounted on said shafts, a belt secured at each end and arranged to contact with equal arcs on said brake-wheels, a pressure member arranged to contact with that portion of the belt which is substantially midway between its points of contact with said brake-wheels and means for varying the influence of said pressure member so as variously to deflect said belt thereby and vary the tension thereof.

3. In a device of the character specified the combination of a pair of gear driven rotatable shafts arranged to rotate in opposite directions, brake-wheels fast mounted on said shafts, a belt secured at each end and arranged to contact with equal arcs on said brake-wheels, a pivotally mounted lever arm, a roller mounted on one end of said lever arm and arranged to bear upon said belt at a point substantially midway between its points of contact with said brakewheels, a coil spring attached to the other end of said lever arm, a flexible member attached to said coil spring, a ratchet-wheel to which said flexible member is attached and upon which said flexible member may be wound in order to vary the tension of said spring, and a pawl arranged to retain said ratchet-wheel against unwinding rotation.

ARTHUR J. HOLMAN.